(12) United States Patent
Frey et al.

(10) Patent No.: US 7,743,029 B2
(45) Date of Patent: Jun. 22, 2010

(54) LOG CONFIGURATION AND ONLINE DEPLOYMENT SERVICES

(75) Inventors: Gregor K. Frey, Lorsch (DE); Miroslav R. Petrov, Sofia (BG); Georgi G. Maneff, Sofia (BG)

(73) Assignee: SAP AG, Walldorf (DE)

( * ) Notice: Subject to any disclaimer, the term of this patent is extended or adjusted under 35 U.S.C. 154(b) by 1292 days.

(21) Appl. No.: 10/836,851

(22) Filed: Apr. 30, 2004

(65) Prior Publication Data

US 2005/0149535 A1    Jul. 7, 2005

Related U.S. Application Data

(63) Continuation-in-part of application No. 10/749,005, filed on Dec. 30, 2003, now abandoned, and a continuation-in-part of application No. 10/749,615, filed on Dec. 30, 2003.

(51) Int. Cl.
*G06F 17/30* (2006.01)
(52) U.S. Cl. ....................................................... 707/648
(58) Field of Classification Search .............. 707/104.1; 705/39
See application file for complete search history.

(56) References Cited

U.S. PATENT DOCUMENTS

| | | | |
|---|---|---|---|
| 5,577,252 A | 11/1996 | Nelson et al. | |
| 5,608,720 A | 3/1997 | Biegel et al. | |
| 5,706,501 A | 1/1998 | Horikiri et al. | |
| 5,745,683 A | 4/1998 | Lee et al. | |
| 6,083,281 A * | 7/2000 | Diec et al. | 717/128 |
| 6,144,967 A * | 11/2000 | Nock | 707/103 R |
| 6,154,777 A | 11/2000 | Ebrahim | |
| 6,466,570 B1 | 10/2002 | Low et al. | |
| 6,539,501 B1 | 3/2003 | Edwards | |
| 6,553,384 B1 | 4/2003 | Frey et al. | |
| 6,721,747 B2 | 4/2004 | Lipkin | |
| 6,751,646 B1 | 6/2004 | Chow et al. | |
| 6,802,067 B1 * | 10/2004 | Camp et al. | 719/315 |
| 6,834,284 B2 | 12/2004 | Acker et al. | |
| 6,850,893 B2 | 2/2005 | Lipkin et al. | |
| 6,871,228 B2 * | 3/2005 | Shah et al. | 709/224 |
| 6,985,848 B2 | 1/2006 | Swoboda et al. | |
| 7,058,639 B1 | 6/2006 | Chatterjee et al. | |

(Continued)

OTHER PUBLICATIONS

"JNDI SPI: Java Naming and Directory Service Provider Interface", *SUN Microsystems, Inc., JNDI SPI: Java Naming and Directory Service Provider Interface, Java Naming and Directory SPI*, Jan. 29, 1998, pp. ii-43, ii-43.

(Continued)

*Primary Examiner*—Don Wong
*Assistant Examiner*—Sheree N Brown
(74) *Attorney, Agent, or Firm*—Blakely Sokoloff Taylor and Zafman LLP

(57) ABSTRACT

Methods and apparatuses for configuring logging of a deployment of an enterprise component are described herein. In one embodiment, in response to a request for deploying an enterprise component, a logging configuration process extracts logging configuration information from a logging configuration file associated with the enterprise component and configures the logging for the respective enterprise component being deployed. The logging configuration file is designed exclusively for configuring logging of the enterprise component. Thereafter, the deployment information of the enterprise component is logged based on the extracted logging configuration information when the enterprise component is deployed. Other methods and apparatuses are also described.

19 Claims, 12 Drawing Sheets

U.S. PATENT DOCUMENTS

| | | | |
|---|---|---|---|
| 7,120,685 | B2 | 10/2006 | Ullmann et al. |
| 7,174,370 | B1 | 2/2007 | Saini et al. |
| 7,240,334 | B1 | 7/2007 | Fluke et al. |
| 7,251,809 | B2 | 7/2007 | Barclay et al. |
| 7,308,475 | B1 | 12/2007 | Pruitt et al. |
| 2003/0005173 | A1 | 1/2003 | Shah et al. |
| 2003/0120593 | A1* | 6/2003 | Bansal et al. .......... 705/39 |
| 2003/0195870 | A1 | 10/2003 | Newcombe et al. |
| 2004/0028059 | A1 | 2/2004 | Josyula et al. |
| 2004/0220926 | A1 | 11/2004 | Lamkin et al. |
| 2004/0237093 | A1 | 11/2004 | Sluiman et al. |

OTHER PUBLICATIONS

"JNDI: Java Naming and Directory Interface", *SUN Microsystems, Inc., JNDI: Java Naming and Directory Interface, Java Naming and Directory*, Jan. 29, 1998, pp. ii-63, Palo Alto, California., ii-63.

Mockapetris, P, ""Domain Name—Implementation Specification"", P. Mockapetris, *RFC 1035, "Domain Name—Impelemntation and Specification"*, Nov. 1987, IETF, p. 1-56, p-156.

Perrone, et al., ""Build Java System with J2EE"", Perrone et al., "*Build Java System with J2EE*", chapter 19, Naming Services Jun. 2000 published by Sams, pp. 1-27, pp. 1-27.

*Non-Final Office Action for* U.S. Appl. No. 10/749,615, Mailed Dec. 23, 2008, 27 pages.

*Non-Final Office Action* dated Oct. 16, 2008, U.S. Appl. No. 10/856,051, filed May 27, 2004, whole document.

*Non-Final Office Action for* U.S. Appl. No. 10/749,005, Mailed Feb. 3, 2009, 16 pages.

*Non-Final Office Action for* U.S. Appl. No. 10/856,051, Mailed Apr. 13, 2009, 15 pages.

*Final Office Action* mailed Jun. 11, 2008, for U.S. Appl. No. 10/749,005, filed Dec. 30, 2003. 13 pages.

*Final Office Action* mailed Aug. 10, 2007, for U.S. Appl. No. 10/749,005, filed Dec. 30, 2003. 8 pages.

*Office Action* mailed Jan. 4, 2008, for U.S. Appl. No. 10/749,005, filed Dec. 30, 2003. 10 pages.

*Office Action* mailed Feb. 26, 2007, for U.S. Appl. No. 10/749,005, filed Dec. 30, 2003. 10 pages.

*Non-Final Office Action for* U.S. Appl. No. 10/749,615 Mailed Jan. 17, 2008, 17 pages.

*Final Office Action for* U.S. Appl. No. 10/749,615, Mailed Jul. 7, 2009, 28 pages.

"Log file logging levels", *Retrieved form internet archive on* Jul. 1, 2009 at: http://web.archive.org/web/20030814011949/http:www.faqs.org/docs/evms/loglevels.html. (Aug. 14, 2003).

Petev, Petio , *Non-Final Office Action*, dated Aug. 10, 2007, U.S. Appl. No. 10/856,051, filed May 27, 2004, 17 pgs.

Petev, Petio , et al., *Non-Final Office Action*, dated Jan. 24, 2008, U.S. Appl. No. 10/856,051, filed May 27, 2004, 15 pgs.

Petev, Petio , et al., *Non-Final Office Action*, dated Dec. 5, 2006, U.S. Appl. No. 10/856,053, filed May 27, 2004, 15 pgs.

Petev, Petio , et al., *Non-Final Office Action*, dated May 31, 2007, U.S. Appl. No. 10/856,053, filed May 27, 2004, 16 pgs.

Petev, Petio , et al., *Final Office Action*, dated Nov. 15, 2007, U.S. Appl. No. 10/856,053, filed May 27, 2004, 15 pgs.

Lee, Rosanna , "The JNDI Tutorial, Building Directory-Enabled Java Applications", published online by Sun, revised Nov. 1, 2002, pp. 1-300.

Lee, Rosanna , "The JNDI Tutorial, Building Directory-Enabled Java Applications", published online by Sun, revised Nov. 1, 2002, pp. 301-600.

Lee, Rosanna , "The JNDI Tutorial, Building Directory-Enabled Java Applications", published online by Sun, revised Nov. 1, 2002, pp. 601-900.

Lee, Rosanna , "The JNDI Tutorial, Building Directory-Enabled Java Applications", published online by Sun, revised Nov. 1, 2002, pp. 901-1170.

Final Office Action for U.S. Appl. No. 10/749,005, Mailed Aug. 3, 2009, 10 pages.

Preferences", pp. 1-24, copyright 2003", <http://java.sun.com/j2se/1.4.2/docs/api/java/util/prefs/package-summary.html>.

USPTO, "FOA Mailed Aug. 19, 2008 for U.S. Appl. No. 10/749,086", Whole Document.

USPTO, "FOA Mailed Sep. 26, 2007 for U.S. Appl. No. 10/749,086", Whole Document.

USPTO, "OA Mailed Feb. 29, 2008 for U.S. Appl. No. 10/749,086", Whole Document.

USPTO, "OA Mailed Feb. 4, 2009 for U.S. Appl. No. 10/749,086", Whole Document.

USPTO, "OA Mailed May 31, 2007 for U.S. Appl. No. 10/749,086", Whole Document.

USPTO, "FOA Mailed Aug. 28, 2008 for U.S. Appl. No. 10/813,999", Whole Document.

USPTO, "Office Action", U.S. Appl. No. 10/748,779, mailed Sep. 26, 2008, 16 pages.

Notice of Allowance and Fees for U.S. Appl. No. 10/749,615, Mailed Jan. 29, 2010. 11 Pages.

* cited by examiner

```xml
<!--
<!DOCTYPE log-configuration SYSTEM "log-configuration.dtd">
-->
<log-configuration>                                                     700
   <log-formatters>                                                     701
      <log-formatter name="myFormatter"
          type="mypackage.FormatterImpl" pattern="somePattern" />
      <log-formatter name="anotherFormatter"
          type="mypackage.AnotherFormatterImpl"
          pattern="anotherPattern" />
   </log-formatters>                                                    702
   <log-destinations>
      <log-destination name="myDestination0" type="FileLog"
          pattern="c:\dest0.log" effective-severity="ERROR"
          encoding="Cp1047" count="5" limit="800000">
         <formatter-ref name="myFormatter" />
         <log-filters>
            <log-filter type="myPackage.SomeFilter" />
         </log-filters>
      </log-destination>
      <log-destination name="myDestination1" type="ConsoleLog">
         <anonymous-formatter type="TraceFormatter" />
         <log-filters>                                                  704
            <log-filter type="mypackage.MyLogFilter" />
         </log-filters>
      </log-destination>
   </log-destinations>                                                  703
   <log-controllers>
      <log-controller name="myLogController" effective-severity="INFO"
          maximum-seveity="NONE">
         <associated-destinations>
            <destination-ref name="myDestination0" association-
                type="LOG" />
            <anonymous-destination type="ConsoleLog" association-
                type="PRIVATE_LOG" />
            <destination-ref name="myDestination1" association-
                type="LOCAL_LOG" />
         </associated-destinations>
         <log-filters>    705
            <log-filter type="mypackage.DestLogFilter1" />
            <log-filter type="mypackage.DestLogFilter2" />
         </log-filters>
      </log-controller>
   </log-controllers>
</log-configuration>
```

LOG CONFIGURATION AND ONLINE DEPLOYMENT SERVICES

RELATED APPLICATIONS

This application is a continuation-in-part (CIP) of U.S. patent application Ser. No. 10/749,005, filed Dec. 30, 2003 now abandoned and U.S. patent application Ser. No. 10/749,615, filed Dec. 30, 2003, which are hereby incorporated by reference.

COPYRIGHT NOTICES

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to the field of enterprise computing. More particularly, this invention relates to log configuration and online deployment services.

BACKGROUND OF THE INVENTION

Logging is employed within virtually all data networks. "Logging" refers generally to recording network-related and/or application-related information in response to one or more predefined network/application events. For example, when an end-user opens a TCP connection to a server, or unsuccessfully attempts to gain access to network resources (e.g., by attempting to log in to a particular server), this information is typically recorded as an entry within a log file. Similarly, if a variable within an application rises above a specified threshold value, a log entry indicating the value and the date and time that the threshold value was exceeded may be stored within a log file. Logging techniques may be employed to record any specified network/application event. Network administrators may then review the log files to identify security issues and/or troubleshoot network problems.

Java 2 Enterprise Edition (J2EE) is a tool commonly used in software development today for developing enterprise applications. Generally, J2EE reduces the costs and complexity associated with developing multi-tier enterprise services. Another advantage of J2EE is that it can be relatively rapidly deployed and enhanced as the need arises. J2EE is currently used in many large-scale application development projects for these reasons.

As application development projects grow larger, logging becomes increasingly more important and complicated. Logging can be a very useful debugging tool to isolate problems, for example, by tracking each stage of the application being evaluated. Typically, logging is configured via a logging configuration file. The logging configuration file typically shared by multiple components being deployed. As enterprise applications increase in size and scope, the logging configuration file becomes more complicated and difficult to manage, resulting in a lack of scalability when deploying large numbers of application components.

SUMMARY OF THE INVENTION

Methods and apparatuses for configuring logging of a deployment of an enterprise component are described herein. In one embodiment, in response to a request for deploying an enterprise component, a logging configuration process extracts logging configuration information from a logging configuration file associated with the enterprise component and configures logging for the respective enterprise component being deployed. Thereafter, the deployment information of the enterprise component is logged based on the extracted logging configuration information when the enterprise component is deployed. Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIG. 7 is an example of a configuration file in an XML format according to one embodiment of the invention.

FIG. 10 is a block diagram illustrating an exemplary graphical user interface (GUI) in accordance with an embodiment of the invention.

DETAILED DESCRIPTION

Figure 1:
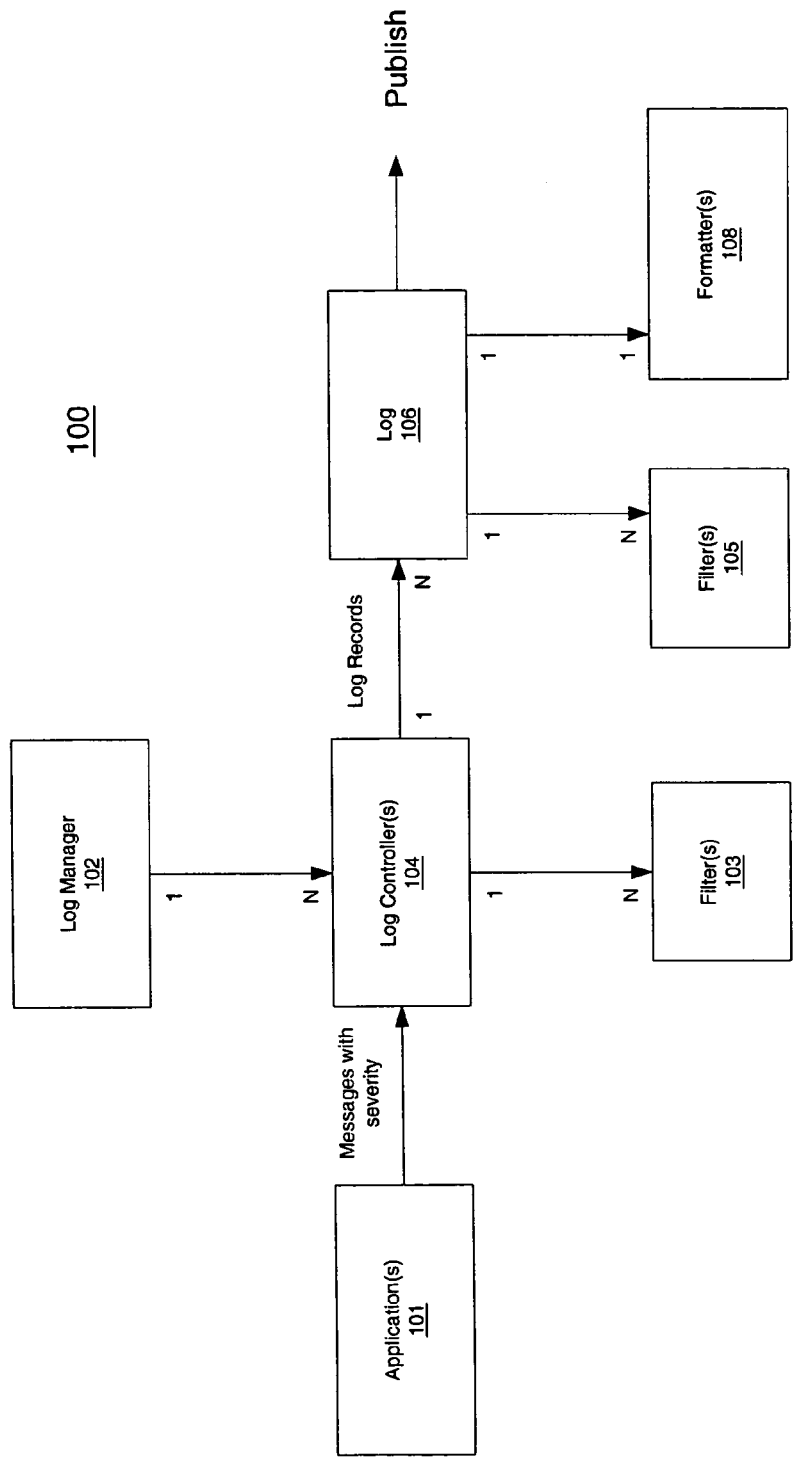
FIG. 1 is a block diagram illustrating an exemplary logging system according to one embodiment of the invention.

Methods and apparatuses for configuring logging of a deployment of an enterprise component are described. According to one aspect of the invention, each of the enterprise components being deployed is associated with a configuration file. The configuration file may be designed exclusively for the respective enterprise component being deployed and used to configure the logging of the respective enterprise component. In one embodiment, the configuration file may be written as a metadata file, such as, for example, an XML (extensible mark-up language) file.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

FIG. 1 is a block diagram illustrating an exemplary logging system according to one embodiment of the invention. The exemplary logging system 100 includes a log manager 102 coupled to one or more log controllers 104 (one shown in FIG. 1, but the "N" markings in FIG. 1 indicate possible presence of N items). The log manager 102 manages the log controllers 104. In one embodiment of the invention, the log manager 102 is part of the kernel of an enterprise engine, such as, for example, a J2EE Engine, and is started at system startup. The log manager configures the logging controllers for the kernel based on one or more configuration files. The log manager may also provide support for storing system critical logs in a database.

Some of the configuration files may be created specifically for a specific deployable component. In one embodiment, the configuration files may be written in as metadata files, such as for example, XML or HTML files. In one embodiment, some or all of the deployable components may be packaged with at least one configuration file for configuring the logging and/or tracing when the respective component is deployed.

In an embodiment of the invention, a log controller 104 may receive messages from executing application (e.g., applications 101). The log controller may be defined as a Java class having two subclasses or modules such as "category" to generate log messages and "location" to generate trace messages. Tracing involves the reconstruction of the control flow of an executing application, which may be used during program development and testing or problem detection, in productive systems (i.e., as an alternative to debugging). Tracing may be switched off during normal operation. Moreover, trace messages may be emitted to locations, which describe delimited code areas such as packages or classes.

Logging may be used to record normal or exceptional events that occur during program execution and this may be switched on during normal operation. The log messages may be emitted to categories, which describe distinguished problem areas such as database problems or security auditing. In an embodiment of the invention, log messages are also visible in a trace.

In an embodiment of the invention, logs typically are addressed to an administrator of a running system while traces typically are addressed to a developer and/or support organization. Thus, the developer may decide whether a message is a log message or trace message.

The logging system 100 further includes a log (also referred to as a destination) 106 coupled to each of the log controllers 104. The log 106 may represent the destination to which the message received by the respective log controller should be sent (or otherwise published). The log 106 is coupled to a formatter 108, which determines the format of the message to be published.

In one embodiment of the invention, a message passed through the logging system 100 may include a log record or potion thereof. The log record may be a structure that holds at best a portion of a message and data corresponding thereto. The log record may include severity information regarding the message, for example, to indicate the importance (severity) of the message. A severity threshold may be set and only a message with an assigned severity that is more severe than this threshold may be recorded and/or published.

According to one embodiment, the logging system 100 optionally includes one or more filters 103 and 105 for the log controllers 104 and log 106 respectively, to further screen out the messages.

Figure 2:
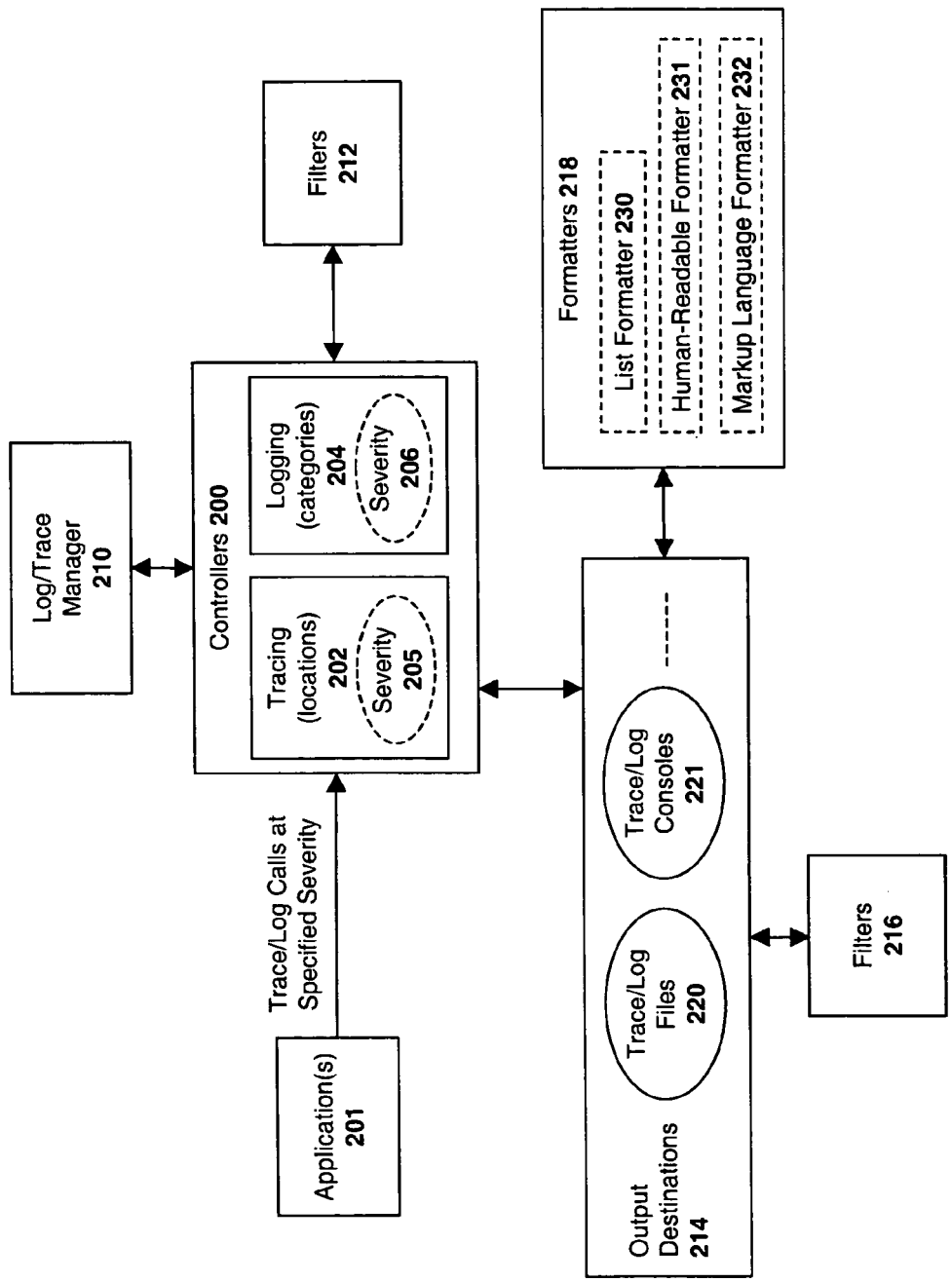
FIG. 2 is a block diagram illustrating an exemplary logging system according to another embodiment of the invention.

FIG. 2 is a block diagram illustrating an exemplary logging system according to another embodiment of the invention. In one embodiment, the exemplary architecture includes a plurality of controllers 200 managed by a log/trace manager 210. The controllers 200 are configured to process trace/logging events generated by a plurality of different applications 201. As used herein, the term "application" is used broadly to refer to any type of program code executed on a computer and/or transmitted over a network (e.g., using a particular network protocol).

In one embodiment, each controller 200 is an instance of a defined "controller" class (e.g., a Java class) which includes two sub-classes, a "tracing" sub-class and a "logging" sub-class (described in detail below), which provide features specific to tracing and logging operations, respectively. In an object-oriented environment such as Java, the tracing controller 202 illustrated in FIG. 2 represents an instance of the tracing sub-class and the logging controller 204 represents an instance of the logging sub-class. In one embodiment of the invention, tracing controllers 202 are associated with program code locations (e.g., locations within packages, classes, . . . etc) whereas logging controllers 204 are associated with system categories (e.g., logical system categories such as database, network, . . . etc).

The controller class provides methods for associating log/trace output destinations with specific controllers 200 and for controlling the actual writing of log/trace messages. When a method is called, the writing of the log/trace message to a log/trace file 220, console 221 or other output destination 214 depends on the severity level associated with the message, the severity settings 205, 206 of the relevant controller(s) 200, and the filtering configuration of one or more optional filters 212 and 216. For example, in one embodiment, messages having a severity level greater than or equal to the effective severity of the relevant controller 200 are candidates for output and are forwarded to the output destinations 214 attached to the controller 200 (i.e., assuming that the messages are not filtered by one of the filters 212, 216).

Before (or after) evaluating the trace/log message based on severity, filters 212 associated with the controller 200 may filter the messages based on predefined filtering criteria. By way of example, if a particular controller 200 is capable of writing to both a file and a console, a filter 212 may be assigned to filter messages directed to the file, thereby limiting output to the console only. Thus, using filters, a finer granularity of log controller 200 output may be defined, using variables other than merely severity. As illustrated in FIG. 2, filters may be associated with particular log controllers 200 and/or with specific output destinations 214 (e.g., specific log/trace files). As mentioned above, filters may be associated with both controllers 200 and/or output destinations 214 to further restrict or alter the output tracing and logging behavior. In one embodiment, multiple filters having different filtering criteria may be allocated to each controller 200 and/or destination 214. Further detailed information concerning the logging architecture may be found in the above-identified co-pending U.S. patent applications.

One embodiment of the invention is implemented in an object-oriented programming environment such as Java (e.g., within a J2EE platform/engine). In this embodiment, each of the modules illustrated in FIG. 2 are represented by objects and/or classes. The classes and/or objects of this embodiment comprise an application programming interface ("API") usable to configure logging and/or tracing operations within a Java environment. It should be noted however, that the underlying principles of the invention are not limited to any particular programming environment. It will be appreciated that other object-oriented programming environments, such as, for example, the .NET frameworks defined by Microsoft (e.g., using C# and/or Visual Basic.NET, etc.), may be utilized.

Figure 3:
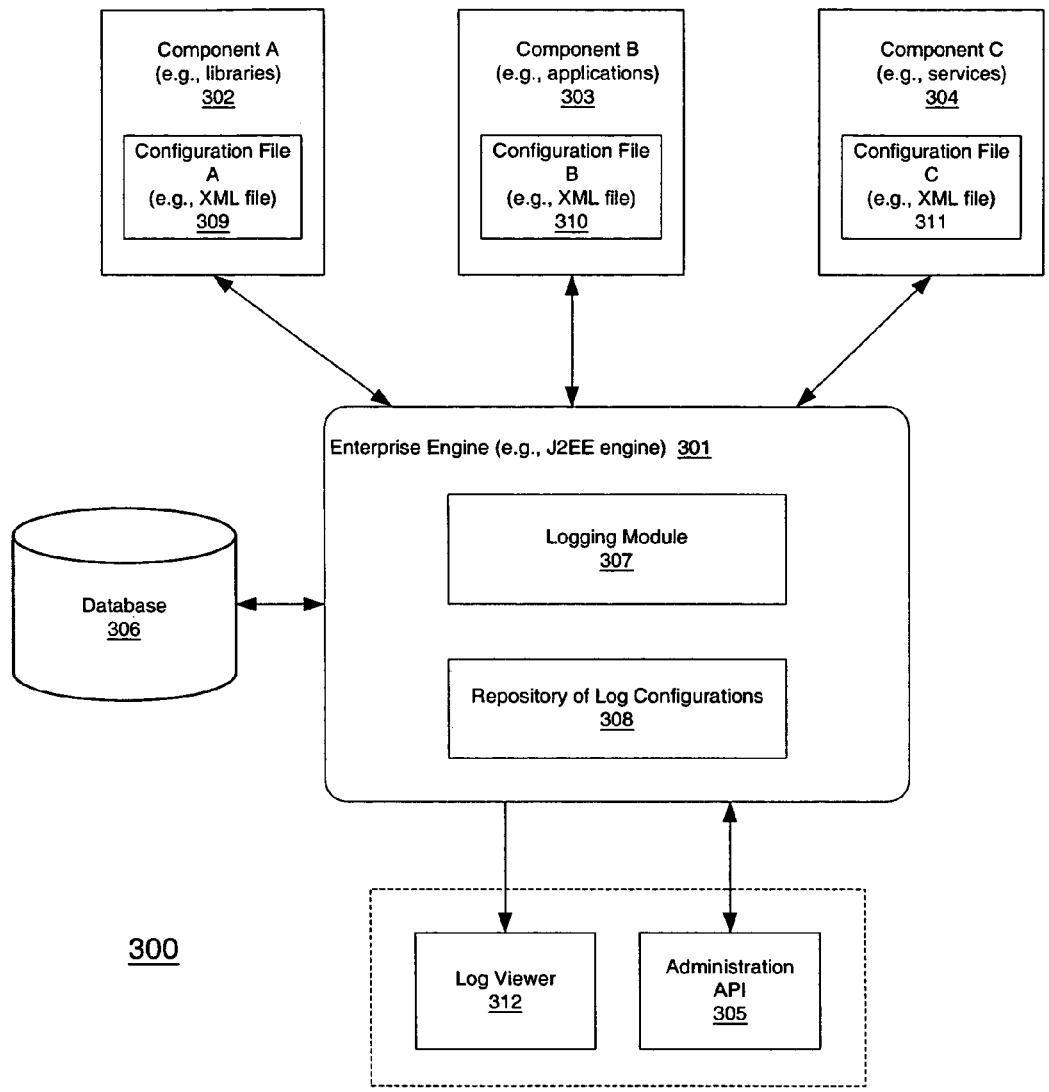
FIG. 3 is a block diagram illustrating an exemplary enterprise system according to one embodiment of the invention.

FIG. 3 is a block diagram illustrating an exemplary enterprise system according to one embodiment of the invention. Referring to FIG. 3, exemplary system 300 includes, but is not limited to, an enterprise engine 301 and one or more enterprise components 302-304 deployable by the enterprise engine 301. Each of the deployable enterprise components 302-304 includes a corresponding configuration file 309-311. In one embodiment, each of the configuration files is designed specifically for the respective enterprise component. For example, configuration files 309-311 are specifically designed for the respective enterprise components 302-304.

In one embodiment, the enterprise engine 301 includes, but is not limited to, a logging module 307 and a repository 308 for temporarily storing the log configuration. In one embodiment, the repository 308 may be implemented as a part of a system memory of the enterprise engine 301. The logging module 307 may include one or more processes executed by an operating system within the enterprise engine 301. The logging module 307 may be a part of logging system implemented within the enterprise engine 301, such as, for example, exemplary logging systems shown in FIGS. 1 and 2.

According to one embodiment, the configuration files 309-311 may be created and edited using a variety of editors, such as, for example, a text editor or a word processor, etc. Alternatively, the configuration files 309-311 may be created and edited via an integrated development environment (IDE), such as, for example, the exemplary IDE shown in FIG. 8.

The operating system may be a Windows operating system from Microsoft Corporation or a MacOS operating system from Apple Computer. Alternatively, the operating system may be a Unix, a Linux, or an embedded operating system from a variety of vendors. The enterprise engine 301 may be implemented within a data processing system, such as, for example, exemplary system 1200 of FIG. 12, which will be described in detail further below.

According to one embodiment, each of the configuration files is specifically packaged with the respective enterprise component. For example, configuration file 309 may be packaged with enterprise component 302. The enterprise components 302-304 may be a variety of deployable enterprise components, such as, for example, enterprise applications, libraries, resources, and/or services. In Java development, for example, a configuration file for an enterprise application may be packaged with the corresponding *.ear file for the respective enterprise application, while a configuration file for a Web application may be packaged with the corresponding *.war file for the respective Web application, etc. In one embodiment, the configuration file may be written as a metadata file, such as, for example, an XML file or a HTML (hypertext mark-up language) file, etc. An example of a configuration file written in XML is shown in FIG. 7.

According to one embodiment, upon receiving a request for deploying an enterprise component, which may be issued by a deployment module (not shown), the logging module 307 retrieves the configuration file from the respective enterprise component being deployed. For example, when the enterprise engine 301 receives a request for deploying enterprise component 302, logging module 107 retrieves configuration file 309 associated with and specifically designed for the enterprise component 302 from a deployable file. For example, if component 302 is an enterprise application, the configuration file 309 and its component file 302 may be packaged within a *.ear file.

Once the configuration file is retrieved, the logging module 307 extracts the logging configuration from the configuration file by parsing the configuration file according to certain predetermined formats and/or policies. Thereafter, the logging module processes the extracted logging configuration information and stores the processed configuration information in the repository 308 and/or database 306. In addition, a copy of the corresponding configuration file may also be permanently stored in database 306 for later use. Once logging has been configured, the system then may perform logging for the specific component during the deployment of the respective component according to the logging configuration of the respective component.

Furthermore, the enterprise engine 301 may include an administration API 315 to allow an administrator to configure the logging at run time after the initial configurations. The administrator 305 may then modify the logging configuration and update the corresponding configuration file stored in the database 306. In addition to the administration API 305, the exemplary enterprise engine 301 may also include a log viewer 312 to allow a user to view the logged information. The log viewer 312 may be integrated within the administration API 315, such as, for example, log viewer 1000 shown in FIG. 10. Alternatively, the log viewer 312 may be standalone log view, such as, for example, log viewer 1100 shown in FIG. 11. Other viewing mechanisms, such as a command line interface (CLI) may be utilized. The log viewer 312 may be locally attached to the enterprise engine 301. Alternatively, the log viewer 312 may be communicatively coupled to the enterprise engine over a network.

Figure 4:
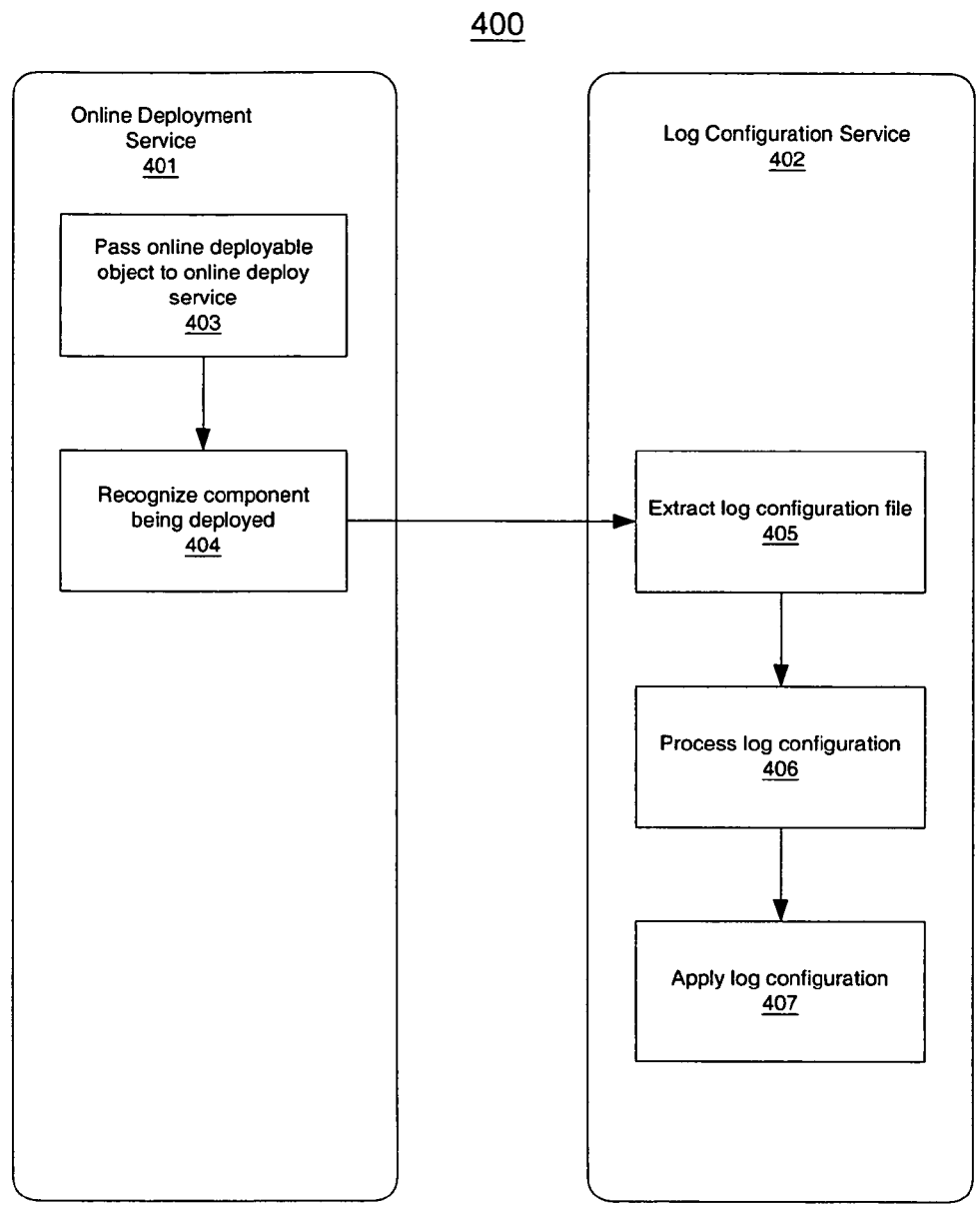
FIG. 4 is a flow diagram illustrating an exemplary process for deploying and configuring logging of an enterprise component according to one embodiment of the invention.

FIG. 4 is a flow diagram illustrating an exemplary process for deploying and configuring logging of an enterprise component according to one embodiment of the invention. Exemplary process 400 may be performed by a processing logic that may include hardware (circuitry, dedicated logic, etc.), software (such as is run on a dedicated machine), or a combination of both. In one embodiment, when a request for deploying an enterprise component is received, a deployment service 401 is invoked. The deployment service 401 may be invoked online by an enterprise engine, such as, for example, enterprise engine 301 of FIG. 3. Once the deployment service 401 is invoked, at block 403, the enterprise component being deployed is passed to the deployment service 401 as an object. At block 404, the deployment service 401 recognizes the type of the enterprise component being deployed. The enterprise component may be, for example, an enterprise application, a library, a resource adapter, or a service.

Once the enterprise component being deployed is recognized, a log configuration service 402 is invoked. In one embodiment, the log configuration service 402 provides, but not limited to, the following functionality:

Initial configuration of logging and tracing for server components—each enterprise component can specify in a configuration file (e.g., an XML file), how the logging and tracing has to be configured. For example, according to one embodiment, the configuration file may be packed in the <dispatcher\server>/descriptors folder within the deployable package of the component.

Mechanisms for runtime management of the logging and tracing configuration—the logging and tracing routines can be configured for a running system using either a graphical user interface or a command line interface (CLI).

Configuration of logging and tracing for applications that are deployed on the enterprise engine (e.g., J2EE engine)—the log configuration service can extract a logging configuration file, if it is packed in the application deployable file.

Once the log configuration service 402 is invoked, at block 405, a configuration file associated with the enterprise component, such as configurations files 309-311 of FIG. 3, is retrieved and the log configuration service 402 extracts the logging configuration information from the configuration file. At block 406, the logging information is processed by the log configuration service 402. During processing the configuration information, one or more policies may be applied. At block 407, the processed logging configuration information is applied to the enterprise component being deployed.

In addition, the processed logging configuration information may be stored in a location of the system memory, such as, for example, the repository 308 of FIG. 3. A copy of the configuration information may also be stored in a database (e.g., database 306 of FIG. 3) for future use, which may be updated subsequently by an administrator. After the logging regarding to the enterprise component being deployed has been configured, logging operations are executed according to the logging configuration. In one embodiment, the above configuration processes may also be applied to the trace configuration that allows a developer to trace the task executions for the purposes of debugging.

Although the above processes have been illustrated in view of the Java enterprise computing environment, it will be appreciated that the above described techniques may also be applied to other enterprise computing environment, particularly, the object oriented programming environment, such as, for example, C# or Visual Basic of the .NET frameworks from Microsoft.

Figure 5:
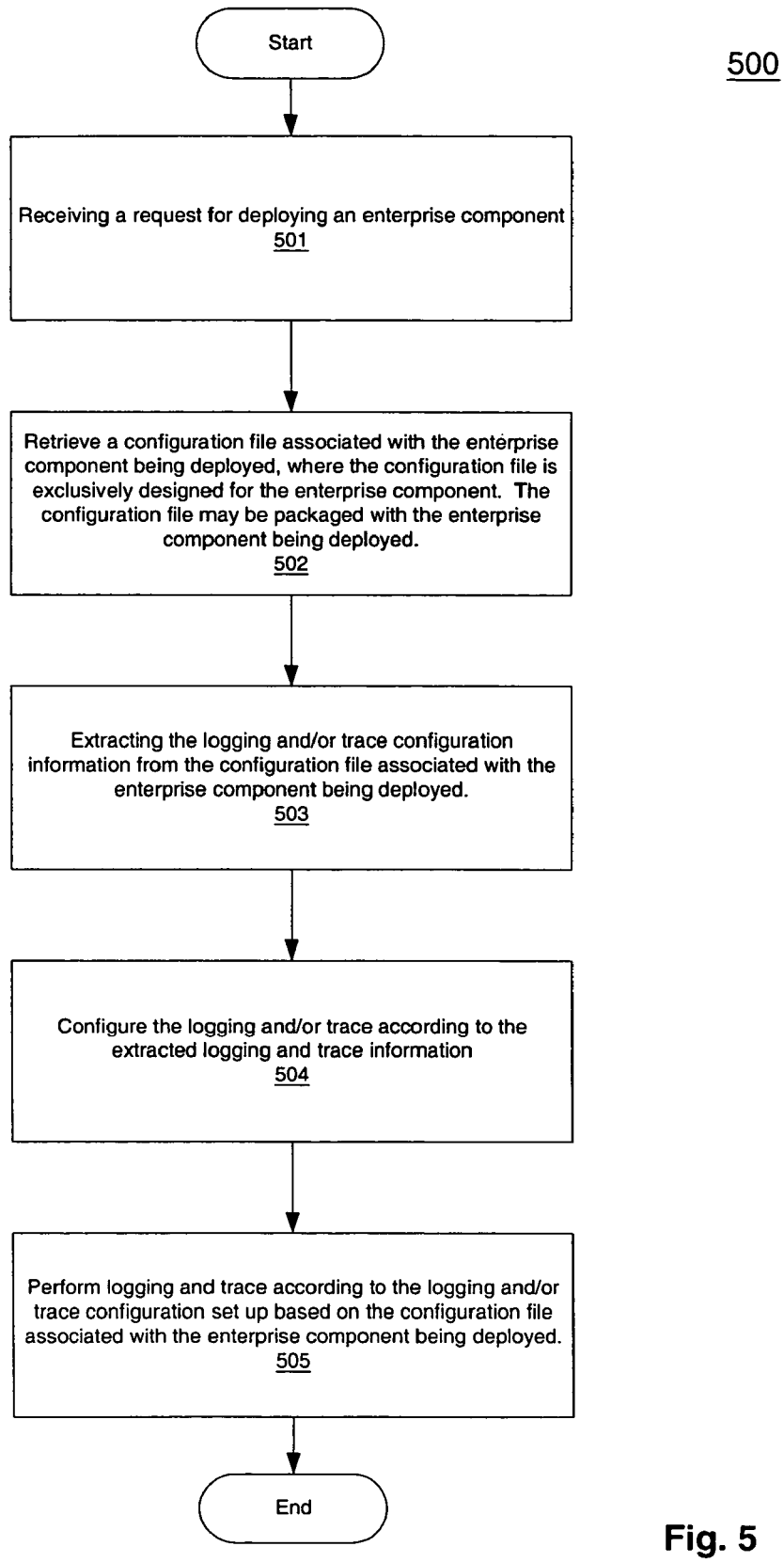
FIG. 5 is a flow diagram illustrating an exemplary process for configuring logging for an enterprise component being deployed, according to one embodiment of the invention.

FIG. 5 is a flow diagram illustrating an exemplary process for configuring logging for an enterprise component being deployed, according to one embodiment of the invention. Exemplary process 500 may be performed by a processing logic that may include hardware (circuitry, dedicated logic, etc.), software (such as is run on a dedicated machine), or a combination of both. In one embodiment, exemplary process 500 includes, but is not limited to, extracting, in response to a request for deploying an enterprise component, logging configuration information from a logging configuration file associated with the enterprise component, the logging configuration file being designed exclusively for configuring logging of the enterprise component, and logging deployment information of the enterprise component based on the extracted logging configuration information when deploying the enterprise component.

Referring to FIG. 5, at block 501, a request for deploying an enterprise component (e.g., enterprise components 302-304 of FIG. 3) is received. The request for deployment may be issued by an enterprise engine, such as, for example, a J2EE engine in a Java computing environment, or alternatively, a .NET framework engine. In one embodiment, a deployment service, such as deployment service 401 of FIG. 4 may be invoked to handle the deployment request. The enterprise component being deployed may be a library, a service, and/or an application of an enterprise server.

In response to the request, at block 502, a configuration file associated with the enterprise component being deployed is retrieved, for example, by a log configuration service (e.g., log configuration service 402 of FIG. 4), where the configuration file is exclusively designed for the respective enterprise component being deployed. That is the configuration file contains exclusive configuration information regarding the respective enterprise component without having to be shared with other enterprise components. In one embodiment, the configuration file is packaged with the associated enterprise component. For example, in Java computing environment, a configuration file for an enterprise application may be packaged within a *.ear file containing the enterprise application, etc.

At block 503, the logging and/or tracing configuration is extracted from the configuration file associated with the enterprise component being deployed. For example, information related to the settings of log formatters, log destinations, and/or log controllers may be extracted from the configuration file. At block 504, the logging and/or tracing of the enterprise component are configured according to the extracted configuration information. When the enterprise component is deployed, at block 505, logging and/or tracing are performed based on the configuration set up based on the configuration file associated with the deployed enterprise component. Other operations may be performed within the scope of embodiments of the invention.

Figure 6:
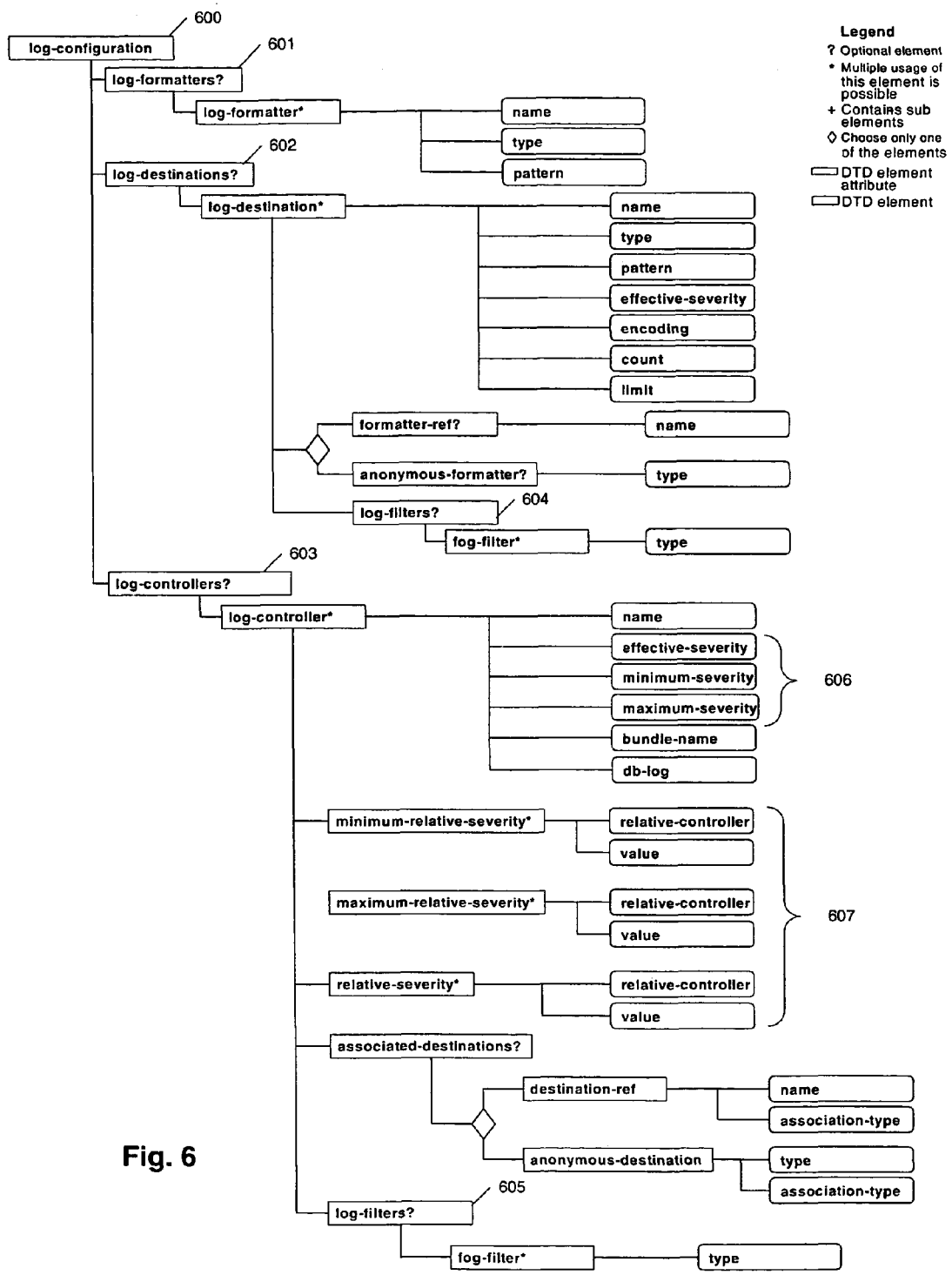
FIG. 6 is block diagram of an exemplary structure of a log configuration file according to one embodiment of the invention.

FIG. 6 is block diagram of an exemplary structure of a log configuration file according to one embodiment of the invention. In one embodiment, exemplary log configuration structure 600 includes, but not limited to, one or more log formatters 601, one or more log destinations 602, and one or more log controllers 603. Each of the log formatters 601, log destinations 602, and log controllers 603 may further include one or more sub-structures, such as, for example, effective severity 606 and relative severity 607. Detailed descriptions for each of the sub-structures according to one embodiment are set out below in the Appendix of the present application.

The configuration files described above may be written according to the exemplary log configuration structure 600 in a variety of formats. In one embodiment, the configuration file may be written as a metadata file, such as, for example, an XML or HTML format. The exemplary configuration structure 600 may be used by an enterprise computing engine, such as, for example, a Java J2EE engine or a .NET framework engine.

In one embodiment, log formatter section 601 may be processed by a formatter component of the logging module (e.g., logging module 307 of FIG. 3), such as, for example, formatters 218 of FIG. 2. Similarly, log destination section 602 may be processed by a destination component of the logging module, such as, for example, output destinations 214 of FIG. 2. In addition, the log controller section 603 may be processed by a controller of the logging module, such as, for example, controllers 200 of FIG. 2. The log destination 602 may further optionally include one or more filters 604. Similarly, the log controller 603 may further optionally include an optional filter 605. Other sections or sub-sections apparent to those with ordinary skill in the art may be included.

FIG. 7 is an example of a configuration file in an XML format according to one embodiment of the invention. In this embodiment, the exemplary configuration file is written in an XML format having the corresponding log configuration structure 700 including, but not limited to, one or more log formatters 701, one or more log destinations 702, and one or more log controllers 703. The destinations 702 and log controllers 703 may further include one or more filters 704 and 705 respectively. Again, as described above, the exemplary XML configuration file may be processed by a variety of enterprise computing engines, such as, for example, a J2EE engine in a Java computing environment or alternatively, a .NET framework engine from Microsoft.

Figure 8:
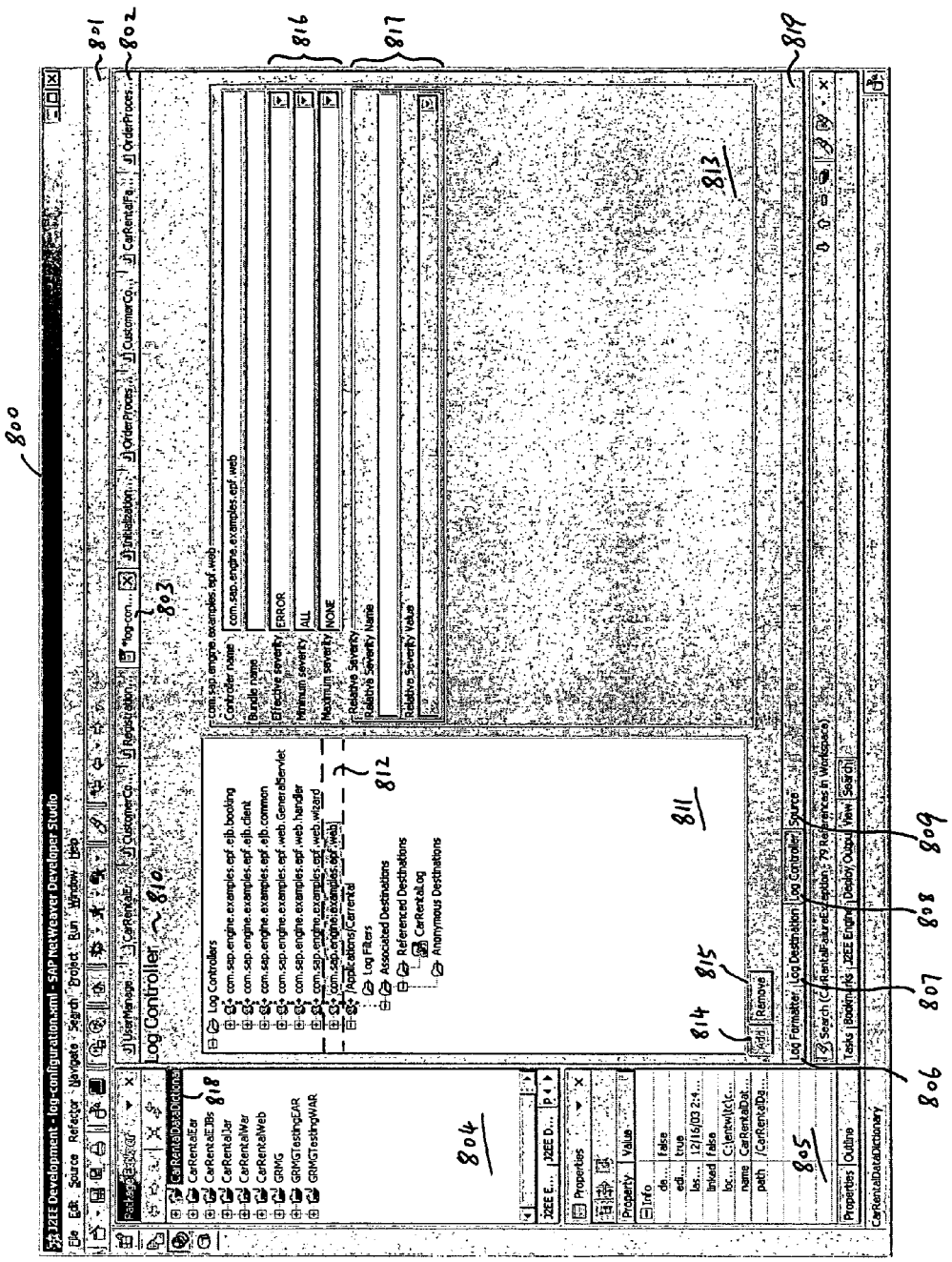
FIG. 8 is a block diagram illustrating an exemplary graphical user interface (GUI) for generating a logging configuration file according to one embodiment of the invention.

FIG. 8 is a block diagram illustrating an exemplary graphical user interface (GUI) for generating a logging configuration file according to one embodiment of the invention. In one embodiment, the exemplary GUI 800 may be included within a wizard designed to generate a logging configuration file. For example, the GUI 800 may be used to release or package a deployable component (e.g. components 302-304 of FIG. 3) by a release engineer, to generate and/or configure logging for each of the deployable components.

Alternatively, according to another embodiment, the exemplary GUI 800 may be included within a development tool for developing enterprise applications. For example, GUI 800 may be a part of an integrated development environment (IDE) for developing Java enterprise applications (e.g., J2EE compatible applications), or alternatively, the exemplary GUI 800 may be part of other enterprise IDE, such as, for example, the .NET framework IDE.

Referring to FIG. 8, according to one embodiment, exemplary GUI 800 includes, but not limited to, a tool bar 801 having one or more buttons or controls that when activated to perform certain tasks. In one embodiment, the tool bar 801 may include a button or control that when activated to generate a logging configuration file for each of the enterprise components being deployed. In one embodiment, exemplary GUI 800 includes a package window 804 to display a list of packages, where each package may include one or more deployable enterprise components. For each of the packages listed in the package window 804, the exemplary GUI 800 may include a property window 805 to list and edit one or more properties corresponding to respective package, such as, for example, package 818 listed in package window 804.

In one embodiment, when one of the packages is selected (e.g., selected package 818), another window having one or more pages may be used to display information associated with the selected package. The one or more pages may be selected via one or more page selectors 802. In one embodiment, the one or more page selector 802 includes a page selector 803 to select a page for configuring a logging configuration file.

According to one embodiment, when page selector 803 is activated, the corresponding page 819 for configuring a logging file is displayed. The page 819 may also include one or more page selectors for configuring specific sections or pages of the logging configuration file. For example, page 819 may include a log formatter page selector 806 to configure log formatter section of the configuration file (e.g., formatter section 601 of FIG. 6), a log destination page selector 807 to configure log destination section of the configuration file (e.g., destination section 602 of FIG. 6), a log controller page selector 808 to configure log controller section of the configuration file (e.g., log controller section 603 of FIG. 6), and other sections, such as, source 809.

In the example shown in FIG. 8, when log controller page selector 808 is activated, its corresponding page 810 is displayed. In one embodiment, page 810 includes, but not limited to, a first window 811 to display one or more log controllers managed and a second window 813 to display one or more properties of one of the log controllers displayed in window 811. In one embodiment, one or more log controllers may be added to via add button 814 and/or removed via remove button 815 from the respective configuration file.

For the purposes of illustrations, when log controller 812 is selected or activated, the properties associated with the selected log controller 812 are displayed in window 813. In one embodiment, the properties displayed may include, but not limited to, effective severity 816 and relative severity 817, etc. Other information such as those shown in FIG. 6 may be displayed.

Once the logging has been configured at the GUI 800, in one embodiment, the information may be saved to a configuration file associated with the respective package (e.g. package 818), where the configuration file may be stored in the same directory as the package (e.g. the same directory of package 818). Subsequently, most of the files in that directory, including the configuration file, may be packaged into a release file, such as, error *.war files. That is, each of the packages listed in window 804 may include a configuration file specifically designed to configure the logging for the respective component.

The exemplary GUI 800 is illustrated for illustrations purposes only. The functionality and the layout of the GUI may vary while still complying with the underlying principles of the invention. For example, the tool bar 801 and/or the page selectors 802 may be implemented at different locations of the GUI, such as, for example, at the bottom of the GUI (e.g., near the status bar). The number of the buttons or controls associated with the tool bar 801 and the page selectors 802 may also vary. The buttons, the fields, the page selectors, and/or other controls may be activated using a variety of different techniques. For example, those buttons, icons, controls, and page selectors may be activated through one or more keys from a keyboard and/or a pointing device (e.g., a mouse). Alternatively, the functionality of these buttons, controls, and/or fields may be activated or deactivated via a pull-down menu or a pop-up menu. It will be appreciated that these elements may also be activated via other methods apparent to those with ordinary skill in the art, such as, for example, a voice interactive command, a stylus, or a command received over a network, such as a VPN (virtual private network), etc.

Figure 9:
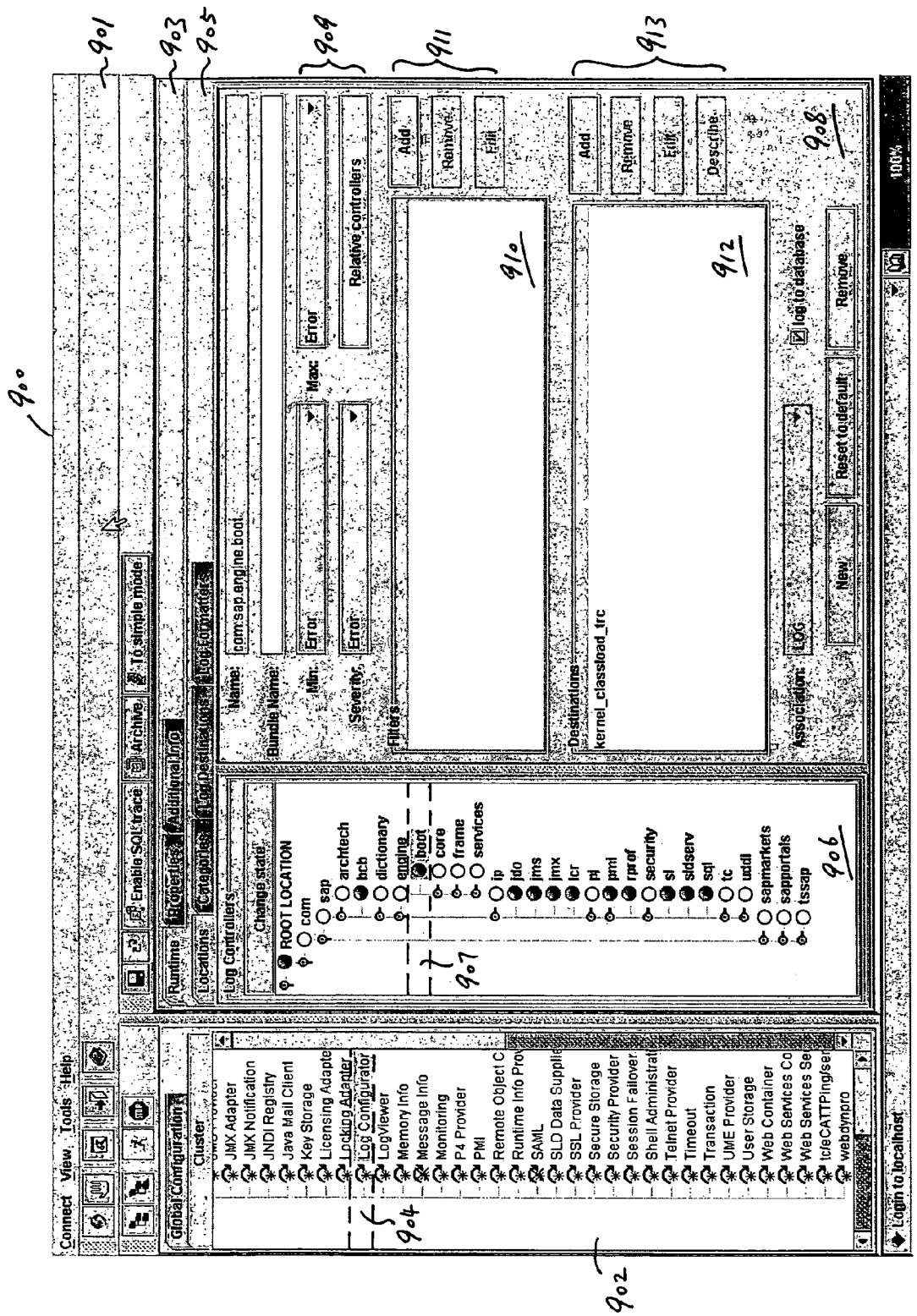
FIG. 9 is a block diagram illustrating an exemplary graphical user interface (GUI) for configuring logging according to one embodiment of the invention.

Although the above logging configurations are performed via an IDE as discussed above, the logging configurations may also be performed via other APIs, particularly, at runtime. FIG. 9 is a block diagram illustrating an exemplary graphical user interface (GUI) for configuring logging according to one embodiment of the invention. In one embodiment, the exemplary GUI 900 may be included within an administration API, such as administration API 305 of FIG. 3. Similar to exemplary GUI 800, exemplary GUI 900 includes, but is not limited to, a tool bar 901 having one or more buttons or controls, a first window 902 to display one or more configurable items, and a second window 903 to display information associated with one of the items selected from window 902. In one embodiment, the items listed in window 902 include, among others, a logging configurator 904.

For the purposes of illustrations, when logging configuration 904 is selected or activated, the properties associated with item 904 may be displayed in window 903. In one embodiment, the logging configuration 904 may include locations, categories, log destinations, and log formatters as shown at field 905. The log controllers of each location may be configured. When the location page is selected (via a corresponding page selector), according to one embodiment, window 906 is used to display a list of the locations where the corresponding log controllers may be configured.

When location 907 is selected, one or more properties of location 908 may be displayed and/or configured in window 908. For example, a user or an administrator may configure the severity 909 of the logging, one or more filters in filter window 910 that may be added or removed using buttons 911, and one or more destinations in destination window 912 that may be added or removed using buttons 913. Other configurations are also contemplated within the scope of the present invention.

The exemplary GUI 900 is illustrated for illustrations purposes only. The functionality and the layout of the GUI may vary. For example, the tool bar 901 and/or the page selectors 903 may be implemented at different locations of the GUI, such as, for example, at the bottom of the GUI (e.g., near the status bar). The number of the buttons or controls associated with the tool bar 901 and the page selectors 905 may vary. The buttons, the fields, the page selectors, and/or other controls may be activated via a variety of manners. For example, those buttons, icons, controls, and page selectors may be activated through one or more keys from a keyboard and/or a pointing device (e.g., a mouse). Alternatively, the functionality of these buttons, controls, and/or fields may be activated or deactivated via a pull-down menu or a pop-up menu. It will be appreciated that they can also be activated via other methods apparent to those with ordinary skill in the art, such as, for example, a voice interactive command, a stylus, or a command received over a network, such as a VPN (virtual private network), etc.

Figure 10:
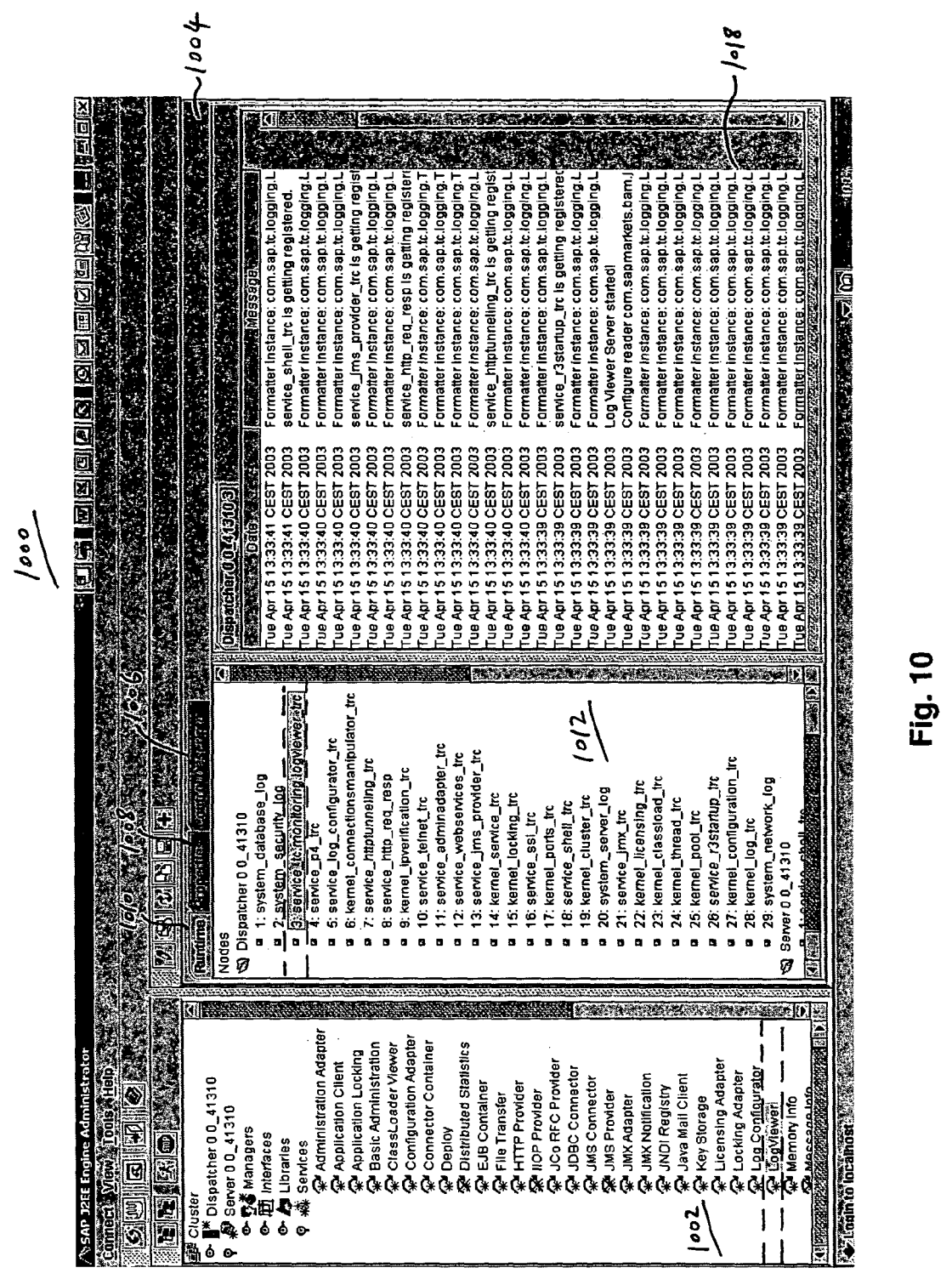

In one embodiment, the log records may also be viewed using the exemplary GUIs 800 and 900. Alternatively, a log viewing GUI may be used to view the log records. FIG. 10 is a block diagram illustrating an exemplary graphical user interface (GUI) 1000 which, in accordance with an embodiment of the invention, may be used by an administrator (e.g., administrator/developer 305 of FIG. 3) to configure or modify the logging of an enterprise component being deployed. Alternatively, the exemplary GUI 1000 may be used by a developer to view (e.g., as a log viewer) or trace (e.g., as a debugger) the deployment or operating information of a deployed enterprise component. The exemplary GUI 1000 may be integrated within the exemplary GUIs 800 and/or 900.

In one embodiment, exemplary GUI 1000 includes, but is not limited to, a service selection area 1002, which permits a user to select from a list of services such as, for example, a "log viewer" to view logged information in accordance with the techniques set forth herein.

After selecting the log viewer option in 1002, the user functions defined separately may be provided with an interface 1004, which permits the user to elect between different tabs. The tabs include a control descriptor tab 1006 to manage the descriptors for the logging, a properties tab 1008 to view and change properties associated with the log viewer, and a runtime tab 1010 to illustrate logged data for a given application, machine, and/or a task listed in the window. The logging data regarding the selected runtime items may then be viewed in a data window 1018 of the GUI 1000. This data may include the identity of the thread, source, severity, message, message identity, date, time, location, and the like (such as illustrated in portion 1018). Other components or options apparent to those with ordinary skill in the art may be included.

Figure 11:
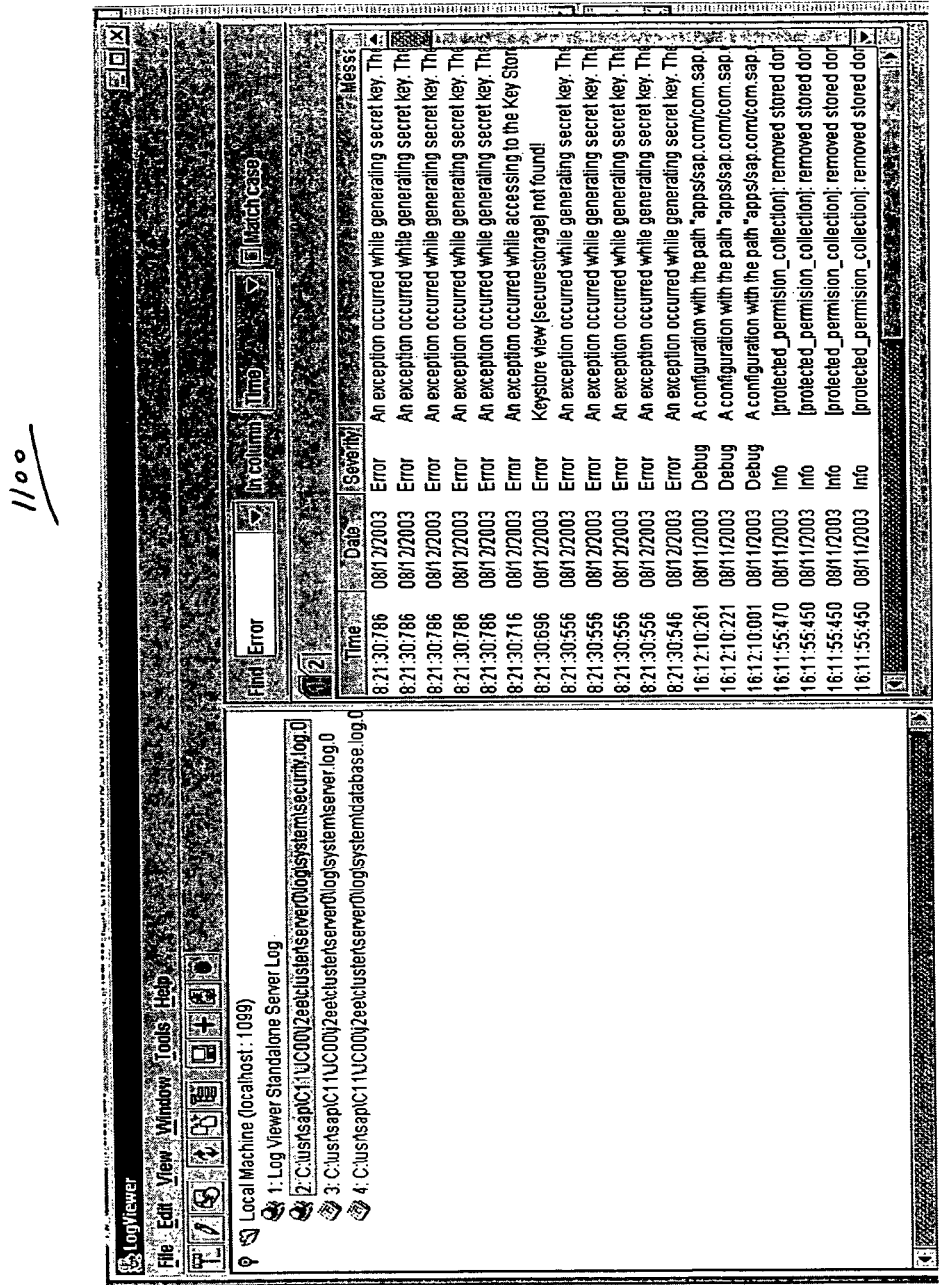
FIG. 11 illustrates an exemplary a standalone log viewer GUI according to one embodiment of the invention.

The log viewer illustrated in FIG. 10 may also be referred to as an online log viewer where the logs written from the enterprise engine and the running applications may be automatically registered. Alternatively, a standalone log viewer may be implemented. In one embodiment, a standalone log viewing system may include a log viewer server and a log viewer client. The logs from a system landscape may be viewed centrally in a standalone log viewer client communicatively coupled to a log viewer server. FIG. 11 illustrates an exemplary a standalone log viewer GUI according to one embodiment of the invention. Other log viewing mechanisms, such as, for example, a command line log viewer, may also be employed.

Figure 12:
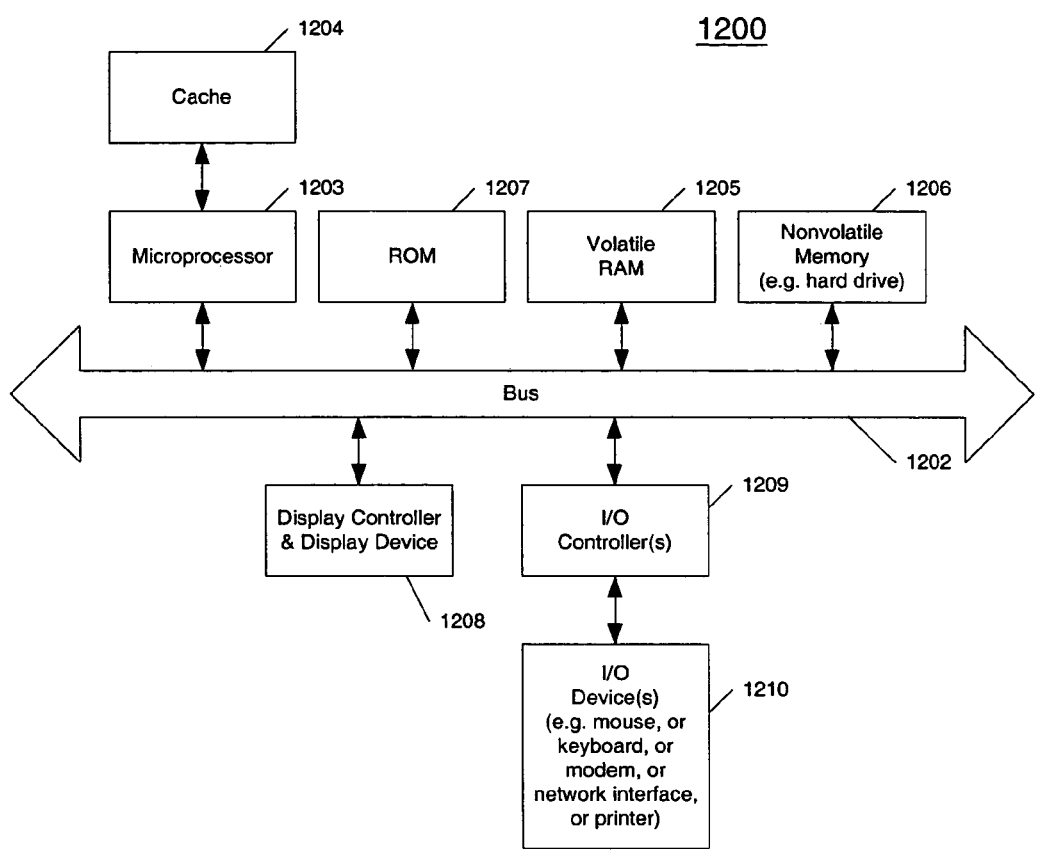
FIG. 12 is a block diagram of a data processing system which may be used with one embodiment of the invention.

FIG. 12 is a block diagram of a data processing system which may be used with one embodiment of the invention. For example, the system 1200 shown in FIG. 12 may be used as an enterprise computing engine or a client.

Note that while FIG. 12 illustrates various components of a computer system, it is not intended to represent any particular architecture or manner of interconnecting the components, as such details are not germane to the present invention. It will also be appreciated that network computers, handheld computers, cell phones, and other data processing systems which have fewer components or perhaps more components may also be used with the present invention. The computer system of FIG. 12 may, for example, be a J2EE engine or a .NET framework engine.

As shown in FIG. 12, the computer system 1200, which is a form of a data processing system, includes a bus 1202 which is coupled to a microprocessor 1203 and a ROM 1207, a volatile RAM 1205, and a non-volatile memory 1206. The microprocessor 1203, which may be a PowerPC microprocessor from Motorola, Inc. or IBM, is coupled to cache memory 1204 as shown in the example of FIG. 12. Alternatively, processor 1203 may be a Pentium Processor from Intel Corporation.

The bus 1202 interconnects these various components together and also interconnects these components 1203, 1207, 1205, and 1206 to a display controller and display device 1208, as well as to input/output (I/O) devices 1210, which may be mice, keyboards, modems, network interfaces, printers, and other devices which are well-known in the art. Typically, the input/output devices 1210 are coupled to the system through input/output controllers 1209.

The volatile RAM 1205 is typically implemented as dynamic RAM (DRAM) which requires power continuously in order to refresh or maintain the data in the memory. The non-volatile memory 1206 is typically a magnetic hard drive, a magnetic optical drive, an optical drive, or a DVD RAM or other type of memory system which maintains data even after power is removed from the system. Typically the non-volatile memory will also be a random access memory, although this is not required. While FIG. 12 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 1202 may include one or more buses connected to each other through various bridges, controllers, and/or adapters, as is well-known in the art. In one embodiment, the I/O controller 1209 includes a USB (Universal Serial Bus) adapter for controlling USB peripherals.

According to one embodiment, in response to a request for deploying an enterprise component, a log configuration service (e.g., log configuration service 402) may be executed from the memory 1205 to cause processor 1203 to perform logging and tracing configurations illustrated by one or more processes set forth above. Other operations may be performed as well.

Thus, methods and apparatuses for configuring logging of a deployment of an enterprise component have been described. In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Appendix

In one embodiment, the usage of at least portions of the elements used in an XML configuration file is explained in detail as follows:

```
<!--
This is the root element for log configuration.
-->
<!ELEMENT log-configuration (log-formatters?, log-destinations?, log-controllers?)>
<!--
Contains a list of log formatters.
-->
<!ELEMENT log-formatters (log-formatter*)>
<!--
Contains a list of log destinations.
-->
<!ELEMENT log-destinations (log-destination*)>
<!--
Contains a list of log controllers.
-->
<!ELEMENT log-controllers (log-controller*)>
<!--
Contains a list of log filters.
-->
<!ELEMENT log-filters (log-filter*)>
<!--
Contains a list of associated destinations. You can have a destination-ref or an anonymous-
destination. These two types are displayed further in this document.
-->
<!ELEMENT associated-destinations ((destination-ref|anonymous-destination)*)>
<!--
Describes a formatter used for formatting log records.
-->
<!ELEMENT log-formatter EMPTY>
<!--
A mandatory attribute that specifies the name of the new formatter.
Example:
<log-formatters>
    <log-formatter name='myFormatter' type='mypackage.FormatterImpl'
  pattern='somePattern'/>
      <log-formatter name='anotherFormatter' type="mypackage.AnotherFormatterImpl"
  pattern='anotherPattern'/>
    </log-formatters>
```

-continued

```
-->
<!ATTLIST log-formatter name CDATA #REQUIRED>
<!--
Defines the type of the formatter. The following default formatter types are available:
ListFormetter, TraceFormatter, XMLFormatter. You can also use your own formatter type.
-->
<!ATTLIST log-formatter type NMTOKEN #REQUIRED>
<!--
Configures the formatter with a custom formatting pattern. The pattern allows you to specify
the message data fields, with place holders of the form %[[-]<width>[-]]<type>, interspersed
with arbitrary text that you want to have included in formatted messages (currently available
only for formatters of type TraceFormatter).
-->
<!ATTLIST log-formatter pattern CDATA #IMPLIED>
<!--
Describes a log destination (which is an abstraction of a file, console output, etc.). To a
destination you can associate additional or already available formatters and filters.
-->
<!ELEMENT log-destination ((formatter-ref|anonymous-formatter)?, log-filters?)>
<!--
Set the name of the destination.
Example:
<log-destinations>
        <log-destination name='myDestination0' type='FileLog' pattern='c:\dest0.log' effective-
severity='ERROR' encoding='Cp1047' count="5" limit='800000'>
            <formatter-ref name='myFormatter'/>
            <log-filters>
                <log-filter type='myPackage.SomeFilter'/>
            </log-filters>
        </log-destination>
    <log-destination name='myDestination1' type='ConsoleLog'>
       <anonymous-formatter type='TraceFormatter'/>
       <log-filters>
          <log-filter type='mypackage.MyLogFilter'/>
       </log-filters>
    </log-destination>
  </log-destinations>
-->
<!ATTLIST log-destination name ID #REQUIRED>
<!--
Sets the destination type. You can either specify your own type, or set a default one: FileLog
or ConsoleLog. If you select a ConsoleLog you do not need to specify Pattern, Limit, and
Count.
-->
<!ATTLIST log-destination type NMTOKEN #REQUIRED>
<!--
Specifies the path to the file where the logs will be written (applicable only for log
destinations of type FileLog).
-->
<!ATTLIST log-destination pattern CDATA #IMPLIED>
<!--
Sets the effective severity of this log.
-->
<!ATTLIST log-destination effective-severity %severities; #IMPLIED>
<!--
Sets the named character encoding to be used for this log. If no character encoding is set the
default character encoding is used.
-->
<!ATTLIST log-destination encoding CDATA #IMPLIED>
<!--
Specifies the number of log files for this destination. If it is not specified only one file is used.
If a number is specified - when the size of the first file reaches the limit specified in the Limit
tag the system starts to write in the second one; this procedure is executed until all the
specified files are full, then the system starts to write again in the first file, that is, overwrites
the first one.
-->
<!ATTLIST log-destination count CDATA #IMPLIED>
<!--
Specifies the size of the file where the logs will be generated.
-->
<!ATTLIST log-destination limit CDATA #IMPLIED>
<!--
Associates the log destination that is described in the parent tag log-destination with a
formatter described in a log-formatter tag. Only one formatter can be associated with a
destination.
-->
<!ELEMENT formatter-ref EMPTY>
<!--
The name of the formatter
```

```
-->
<!ATTLIST formatter-ref name CDATA #REQUIRED>
<!--
Associates the log destination that is described in the parent tag log-destination with an
anonymous formatter (that is a formatter that is not explicitly described with a log-formatter
tag). One cannot specify a pattern for an anonymous formatter
-->
<!ELEMENT anonymous-formatter EMPTY>
<!--
Specifies the type of the anonymous formatter.
-->
<!ATTLIST anonymous-formatter type NMTOKEN #REQUIRED>
<!--
Describes a log controller. The log controller is an abstraction of a logger that can be used
either for tracing (in this case it is called Location and "." symbol is used as a separator to
denote the hierarchical structure) of for logging (then it is called Category and "/" symbol is
used as a separator).
-->
<!ELEMENT log-controller (minimum-relative-severity*, maximum-relative-severity*,
relative-severity*, associated-destinations?, log-filters?)>
<!--
Describes the name of the log controller. Two types of log controller names are available -
names for categories and names for locations.
Categories are named according to the hierarchical structure known from file systems. You
can group together all the categories of log messages concerned with one particular issue
under one category. The category name must be separated by "/".
Locations are named according to the hierarchical structure known from Java packages. The
category name must be separated by ".".
-->
<!ATTLIST log-controller name CDATA #REQUIRED>
<!--
Sets effective severity to this log controller.
-->
<!ATTLIST log-controller effective-severity %severities; #IMPLIED>
<!--
Sets minimum severity to this log controller.
-->
<!ATTLIST log-controller minimum-severity %severities; #IMPLIED>
<!--
Sets maximum severity to this log controller
-->
<!ATTLIST log-controller maximum-severity %severities; #IMPLIED>
<!--
Assigns a resource bundle name to this log controller. If a resource bundle is assigned,
language-independent log messages can be written.
-->
<!ATTLIST log-controller bundle-name CDATA #IMPLIED>
<!--
An optional attribute that specifies whether this log controller will store system critical
messages in the database. The default value is "true".
-->
<!ATTLIST log-controller db-log %boolean; #IMPLIED>
<!--
Sets the minimum severity of this log controller. If its current maximum severity is lower than
the argument, the former is set to the argument. If it is a root controller, this method has the
same effect as a call to the effective-severity.
-->
<!ELEMENT minimum-relative-severity EMPTY>
<!--
The name of the relative controller.
-->
<!ATTLIST minimum-relative-severity relative-controller CDATA #REQUIRED>
<!--
The value of the minimum relative severity.
-->
<!ATTLIST minimum-relative-severity value %severities; #REQUIRED>
<!--
Sets the maximum severity of this log controller. If its current minimum severity is higher
than the argument, the former is set to the argument. If it is a root controller, the method has
the same effect as a call to the effective-severity.
-->
<!ELEMENT maximum-relative-severity EMPTY>
<!--
The name of the relative controller.
```

-continued

```
-->
<!ATTLIST maximum-relative-severity relative-controller CDATA #REQUIRED>
<!--
The value of the maximum relative severity.
-->
<!ATTLIST maximum-relative-severity value %severities; #REQUIRED>
<!--
Sets relative severity to the described log controller. When there is a relative severity set, the
effective severity is calculated as the minimum severity of direct severity and severity related
to its relative.
-->
<!ELEMENT relative-severity EMPTY>
<!--
The name of the relative controller.
-->
<!ATTLIST relative-severity relative-controller CDATA #REQUIRED>
<!--
The value of the relative severity.
-->
<!ATTLIST relative-severity value %severities; #REQUIRED>
<!--
Describes a filter that, besides the effective severity, controls output via the log controller or
log destination. The results of all filters for a given message are logically anded to determine
whether a message is to be written to the associated log objects.
-->
<!ELEMENT log-filter EMPTY>
<!--
The type (that is, the full-packaged class name) of the filter.
-->
<!ATTLIST log-filter type NMTOKEN #REQUIRED>
<!--
Associates the log controller that is described in the parent tag log-controller with a formatter
described in a log-destination tag. Many destinations can be associated with a log controller.
-->
<!ELEMENT destination-ref EMPTY>
<!--
The name of the associated destination.
-->
<!ATTLIST destination-ref name IDREF #REQUIRED>
<!--
Specifies the type of the association. It can be one of these : PRIVATE_LOG, LOCAL_LOG
or LOG
-->
<!ATTLIST destination-ref association-type %association-types; #REQUIRED>
<!--
Associates the log controller that is described in the parent tag log-controller with an
anonymous destination (that is a destination that is not explicitly described with a log-
destination tag). One cannot specify additional attributes(except type) for an anonymous
destination.
-->
<!ELEMENT anonymous-destination EMPTY>
<!--
Sets the destination type. You can either specify your own type, or set a default one: FileLog
or ConsoleLog. If you select a ConsoleLog you do not need to specify Pattern, Limit, and
Count.
-->
<!ATTLIST anonymous-destination type NMTOKEN #REQUIRED>
<!--
Specifies the type of the association. It can be one of these: PRIVATE_LOG, LOCAL_LOG
or LOG
-->
<!ATTLIST anonymous-destination association-type %association-types;
#REQUIRED>
```

It will be appreciated that other formats or sections may be defined within the scope of the embodiments of the invention.

What is claimed is:

1. A method for deploying an enterprise component in an enterprise computing environment, the method comprising:

in response to a granted request for deploying an enterprise component, extracting logging configuration information from a logging configuration file packed with the enterprise component prior to deployment, wherein the logging configuration file specifies how the deployment information should be logged during the deployment;

logging deployment information of the enterprise component based on the extracted logging configuration information during deployment of the enterprise component; and storing the logged deployment information in a storage.

2. The method of claim 1, further comprising retrieving the configuration file from a deployable file containing the enterprise component, in response to the granted request.

3. The method of claim 1, wherein the enterprise component is one of an interface component, a resource component, a service component, and a library component.

4. The method of claim 1, further comprising storing the logging configuration file in a database for later use after the enterprise component is deployed.

5. The method of claim 4, further comprising:
updating the logging configuration information via an administration API;
and storing the updated logging configuration information in the logging configuration file stored in the database.

6. The method of claim 5, further comprising logging deployment information of the enterprise component according to one or more policies of the updated logging configuration file during the redeployment of the enterprise component in response to a granted request for redeployment.

7. The method of claim 1, wherein the logging configuration file is written as a metadata file.

8. The method of claim 1, wherein the enterprise component is a J2EE compatible component.

9. A apparatus for deploying an enterprise component in an enterprise computing environment, the apparatus comprising:
a log manager for managing logging deployment information of an enterprise component during the deployment of the enterprise component in response to a granted request for deployment; and
a log configuration service, when executed by the log manager, causes the log manager to
in response to a granted request for deploying an enterprise component, extract logging configuration information from a logging configuration file packed with the enterprise component prior to deployment, wherein the logging configuration file specifies how the deployment information should be logged during the deployment;
log deployment information of the enterprise component based on the extracted logging configuration information during deployment of the enterprise component in response of a granted request for deployment; and
store the logged deployment information in a storage.

10. The apparatus of claim 9, wherein the log manager retrieves the configuration file from a deployable file containing the enterprise component.

11. The apparatus of claim 9, wherein the enterprise component is one of an interface component, a resource component, a service component, and a library component.

12. The apparatus of claim 9, wherein the log manager stores the logging configuration file in a database for later use after the enterprise component is deployed.

13. The apparatus of claim 12, further comprising an administration API to allow an administrator to:
update the logging configuration information; and
store the updated logging configuration information in the logging configuration file stored in the database.

14. The apparatus of claim 13, wherein the log manager logs deployment information of the enterprise component according to one or more policies of the updated logging configuration file during the redeployment of the enterprise component in response to a granted request for redeployment.

15. The apparatus of claim 9, wherein the logging configuration file is written as a metadata file.

16. The apparatus of claim 9, wherein the enterprise component is a J2EE compatible component.

17. A machine-readable storage medium having executable code to cause a machine to perform a method, the method comprising:
in response to a granted request for deploying an enterprise component, extracting logging configuration information from a logging configuration file packed with the enterprise component prior to deployment, wherein the logging configuration file specifies how the deployment information should be logged during the deployment;
logging deployment information of the enterprise component based on the extracted logging configuration information during deployment of the enterprise component; and
storing the logged deployment information in a storage.

18. An enterprise computing system, comprising:
a processor;
a memory coupled to the processor; and
a logging process executed from the memory, in response to a granted request for deploying an enterprise component causes the processor to
extract logging configuration information from a logging configuration file packed with the enterprise component prior to deployment, wherein the logging configuration file specifies how the deployment information should be logged during the deployment;
log deployment information of the enterprise component based on the extracted logging configuration information during deployment of the enterprise component; and
store the logged deployment information in a storage.

19. A method for deploying enterprise components in an enterprise computing environment, the method comprising:
in response to a granted request for deploying a plurality of enterprise components, for each of the plurality of the enterprise components being deployed, extracting configuration information from a configuration file packed with the respective enterprise component prior to deployment;
deploying each of the plurality of enterprise components using the configuration information extracted from the respective configuration file;
logging deployment information for the respective enterprise component according to one or more logging policies specified in the respective configuration file, wherein the logging policies in the configuration file specify how the deployment information should be logged during the deployment of the respective enterprise component; and
storing the logged deployment information in a storage.

* * * * *